(12) United States Patent
Zoph et al.

(10) Patent No.: US 10,853,726 B2
(45) Date of Patent: Dec. 1, 2020

(54) NEURAL ARCHITECTURE SEARCH FOR DENSE IMAGE PREDICTION TASKS

(71) Applicant: Google LLC, Mountain View, CA (US)

(72) Inventors: Barret Zoph, Sunnyvale, CA (US); Jonathon Shlens, San Francisco, CA (US); Yukun Zhu, Shoreline, WA (US); Maxwell Donald Emmet Collins, Santa Monica, CA (US); Liang-Chieh Chen, Los Angeles, CA (US); Gerhard Florian Schroff, Santa Monica, CA (US); Hartwig Adam, Marina del Rey, CA (US); Georgios Papandreou, Los Angeles, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/425,900

(22) Filed: May 29, 2019

(65) Prior Publication Data

US 2019/0370648 A1 Dec. 5, 2019

(30) Foreign Application Priority Data

May 29, 2018 (GR) .............................. 20180100232

(51) Int. Cl.
*G06N 3/08* (2006.01)
*G06N 20/00* (2019.01)
(Continued)

(52) U.S. Cl.
CPC .............. *G06N 3/08* (2013.01); *G06F 17/15* (2013.01); *G06K 9/6256* (2013.01); *G06N 3/0454* (2013.01); *G06N 20/00* (2019.01)

(58) Field of Classification Search
CPC ........ G06N 3/08; G06N 20/00; G06N 3/0454; G06F 17/15; G06K 9/6256
(Continued)

(56) References Cited

U.S. PATENT DOCUMENTS 9,939,272 B1 * 4/2018 Liao .................. G06K 9/00664
2013/0212052 A1 * 8/2013 Yu ............................ G06N 3/04
706/25
(Continued)

FOREIGN PATENT DOCUMENTS

CN 109145911 A * 1/2019

OTHER PUBLICATIONS

Cai et al., "Efficient Architecture Search by Network Transformation" Nov. 21, 2017 The Thirty-Second AAAI Conference on Artificial Intelligence (AAAI-18), pp. 2787-2794 (Year: 2017).*
(Continued)

*Primary Examiner* — Miranda M Huang
*Assistant Examiner* — Chase P. Hinckley
(74) *Attorney, Agent, or Firm* — Fish & Richardson P.C.

(57) ABSTRACT

Methods, systems, and apparatus, including computer programs encoded on computer storage media, for determining neural network architectures. One of the methods includes obtaining training data for a dense image prediction task; and determining an architecture for a neural network configured to perform the dense image prediction task, comprising: searching a space of candidate architectures to identify one or more best performing architectures using the training data, wherein each candidate architecture in the space of candidate architectures comprises (i) the same first neural network backbone that is configured to receive an input image and to process the input image to generate a plurality of feature maps and (ii) a different dense prediction cell configured to process the plurality of feature maps and to generate an output for the dense image prediction task; and determining the architecture for the neural network based on the best performing candidate architectures.

21 Claims, 4 Drawing Sheets

(51) Int. Cl.
  *G06F 17/15* (2006.01)
  *G06K 9/62* (2006.01)
  *G06N 3/04* (2006.01)
(58) Field of Classification Search
  USPC .......................................................... 706/15
  See application file for complete search history.

(56) References Cited

U.S. PATENT DOCUMENTS

| | | | | |
|---|---|---|---|---|
| 2014/0181171 | A1* | 6/2014 | Dourbal | G06F 17/16 708/607 |
| 2015/0169369 | A1* | 6/2015 | Baskaran | G06F 9/4881 718/102 |
| 2016/0013773 | A1* | 1/2016 | Dourbal | G06F 17/16 708/209 |
| 2016/0259994 | A1* | 9/2016 | Ravindran | G06K 9/00 |
| 2017/0032285 | A1* | 2/2017 | Sharma | G06N 3/08 |
| 2017/0147905 | A1* | 5/2017 | Huang | G06K 9/6232 |
| 2017/0213070 | A1* | 7/2017 | Aghamohammadi | G06K 9/00201 |
| 2018/0068198 | A1* | 3/2018 | Savvides | G06K 9/3233 |
| 2018/0089505 | A1* | 3/2018 | El-Khamy | G06T 7/11 |
| 2019/0034784 | A1* | 1/2019 | Li | G06N 3/08 |
| 2019/0347548 | A1* | 11/2019 | Amizadeh | G06N 3/08 |

OTHER PUBLICATIONS

Lin et al., "Feature Pyramid Networks for Object Detection" Apr. 19, 2017 Computer Vision Foundation, pp. 2117-2125. (Year: 2017).*
Li et al., "DetNet: A Backbone network for Object Detection" Apr. 19, 2018 pp. 1-17. (Year: 2018).*
Gidaris et al., "Detect, Replace, Refine: Deep Structured Prediction for Pixel Wise Labeling" 2017 IEEE Conference on Computer Vision and Pattern Recognition, pp. 7187-7196. (Year: 2017).*
Abadi et al., "TensorFlow: A System for Large-Scale Machine Learning" Nov. 2-4, 2016 Proceedings of the 12th USENIX Symposium on Operating Systems Design and Implementation pp. 264-283. (Year: 2016).*
Wu et al., "Shift: A Zero FLOP, Zero Parameter Alternative to Spatial Convolutions" Dec. 3, 2017 pp. 1-9. (Year: 2017).*
Chen et al., "DeepLab: Semantic Image Segmentation with Deep Convolutional Nets, Atrous Convolution, and Fully Connected CRFs" May 12, 2017 pp. 1-14. (Year: 2017).*
Ponti et al., "Everything you wanted to know about Deep Learning for Computer Vision but were afraid to ask" 2017 30th SIBGRAPI Conference on Graphics, Patterns, and Images Tutorials, pp. 17-41. (Year: 2017).*
Liu et al., "Hierarchical Representations for Efficient Architecture Search" Feb. 22, 2018 ICLR 2018 pp. 1-13. (Year: 2018).*
Zoph et al., "Learning Transferable Architecture for Scalable Image Recognition" Jul. 21, 2017 pp. 1-15. (Year: 2017).*
Zoph et al., "Neural Architecture Search with Reinforcement Learning" Feb. 15, 2017 ICLR 2017 pp. 1-16. (Year: 2017).*
Zhou et al., "Incorporating Side-Channel Information into Convolutional Neural Networks for Robotic Tasks" May 29-Jun. 3, 2017, IEEE International Conference on Robotics and Automation (ICRA), pp. 2177-2183. (Year: 2017).*
Khoker et al., "Violent Scene Detection using a Super Descriptor Tensor Decomposition" Nov. 23-25, 2015 IEEE International Conference on Digital Image Computing: Techniques and Applications (DICTA). (Year: 2015).*
He et al., "Mask R-CNN" Apr. 5, 2017 pp. 1-10. (Year: 2017).*
Kreso et al., "Ladder-style DenseNets for Semantic Segmentation of Large Natural Images" 2017 IEEE International Conference on Computer Vision Workshops, pp. 238-245. (Year: 2017).*
Tatarchenko et al., "Octree Generating Networks: Efficient Convolutional Architectures for High-resolution 3D Outputs" 2017 IEEE International Conference on Computer Vision, pp. 2107-2115. (Year: 2017).*
Singh et al., "A Neural Candidate-Selector Architecture for Automatic Structured Clinical Text Annotation" Nov. 6-10, 2017 CIKM '17, pp. 1519-1528. (Year: 2017).*
Badrinarayanan et al., "SegNet: A Deep Convolutional Encoder-Decoder Architecture for Image Segmentation" Oct. 10, 2016, pp. 1-14. (Year: 2016).*
Gao et al., "Efficient and Invariant Convolutional Neural Networks for Dense Prediction" Nov. 24, 2017. (Year: 2017).*
Guan et al., "Atrous Faster R-CNN for Small Scale Object Detection" 2017 2nd International Conference on Multimedia and Image Processing, pp. 16-21. (Year: 2017).*
Wang et al., "Sketch-based 3D Shape Retrieval using Convolutional Neural Networks" 2015 Computer Vision Foundation, pp. 1875-1883. (Year: 2015).*
Wang et al., "Learning Object Interactions and Descriptions for Semantic Image Segmentation", 2017 Computer Vision Foundation, pp. 5859-5867. (Year: 2017).*
Dai et al., "Deformable Convolutional Networks" 2017 IEEE International Conference on Computer Vision, pp. 764-773. (Year: 2017).*
Baker et al., "Accelerating Neural Architecture Search Using Performance Prediction" Nov. 8, 2017, ICLR 2018, pp. 1-14. (Year: 2018).*
Badrinarayanan et al., "SegNet: A Deep Convolutional Encoder-Decoder Architecture for Image Segmentation" Dec. 2017, IEEE Transactions on Pattern Analysis and Machine Intelligence, pp. 2481-2495. (Year: 2017).*
Zeng et al., "Recurrent Encoder-Decoder Networks for Time-Varying Dense Prediction" 2017, IEEE International Conference on Data Mining, pp. 1165-1170. (Year: 2017).*
Kandasamy et al., "Neural Architecture Search with Bayesian Optimisation and Optimal Transport" Feb. 11, 2018. (Year: 2018).*
Suganuma et al., "A Genetic Approach to Designing Convolutional Neural Network Architectures" Jul. 15, 2017, pp. 497-504. (Year: 2017).*
Pham et al., "Faster Discovery of Neural Architectures by Searching for Paths in a Large Model" Feb. 15, 2018, ICLR 2018 as viewed on Jan. 15, 2020 at https://openreview.net/forum?id=ByQZjx-0-&noteId=rJWmCYxyM (Year: 2018).*
Real et al., "Regularized Evolution for Image Classifier Architecture Search" Mar. 1, 2018. (Year: 2018).*
Liu et al., "Progressive Neural Architecture Search" Mar. 24, 2018. (Year: 2018).*
Wang et al., "AlphaX: eXploring Neural Architectures with Deep Neural Networks and Monte Carlo Tree Search" May 18, 2018, pp. 1-18. (Year: 2018).*
Elsken et al., "Simple and Efficient Architecture Search for Convolutional Neural Networks" Nov. 13, 2017, pp. 1-14. (Year: 2017).*
Brock et al., "SMASH: One-Shot Model Architecture Search through HyperNetworks" Aug. 17, 2017, pp. 1-21. (Year: 2017).*
Andriluka et al, "2d human pose estimation: New benchmark and state of the art analysis" CVPR, 2014, 8 pages.
Baker et al, "Designing neural network architectures using reinforcement learning" arXiv, Mar. 2017, 18 pages.
Bell et al, "Material recognition in the wild with the materials in context database" CVPR, 2015, 9 pages.
Bergstra et al, "Random search for hyper-parameter optimization" JMLR, Feb. 2012, 25 pages.
Bulò et al, "In-place activated batchnorm for memory-optimized training of dnns" arXiv, Oct. 2018, 12 pages.
Chan et al, "Listen, attend and spell: A neural network for large vocabulary conversational speech recognition" arXiv, Aug. 2015, 16 pages.
Chen et al, "Attention to scale: Scale-aware semantic image segmentation" CVPR, 2016, 10 pages.
Chen et al, "Detect what you can: Detecting and representing objects using holistic models and body parts" arXiv, Jun. 2014, 9 pages.
Chen et al, "Encoder-decoder with atrous separable convolution for semantic image segmentation" arXiv, Aug. 2018, 18 pages.
Chen et al, "Net2Net: Accelerating learning via knowledge transfer" arXiv, Apr. 2016, 12 pages.

(56) References Cited

OTHER PUBLICATIONS

Chen et al, "Rethinking atrous convolution for semantic image segmentation" arXiv, Dec. 2017, 14 pages.
Chen et al, "Semantic image segmentation with deep convolutional nets and fully connected crfs" arXiv, Jun. 2016, 14 pages.
Chen et al., "Masklab: Instance segmentation by refining object detection with semantic and direction features" CVPR, 2018, 10 pages.
Chollet et al, "Xception: Deep Learning with Depthwise Separable Convolutions," arXiv, Apr. 2017, 8 pages.
Cordts et al, "The cityscapes dataset for semantic urban scene understanding" arXiv, Apr. 2016, 29 pages.
Dai et al, "Convolutional feature masking for joint object and stuff segmentation" arXiv, Apr. 2015, 10 pages.
Dai et al, "Instance-aware semantic segmentation via multi-task network cascades" arXiv, Dec. 2015, 10 pages.
Dai et al, "R-fcn: Object detection via region-based fully convolutional network" NIPS, 2016, 9 pages.
Eigen et al, "Predicting depth, surface normals and semantic labels with a common multi-scale convolutional architecture" arXiv, Dec. 2015, 9 pages.
Everingham et al, "The pascal visual object classes challenge—a retrospective" Int J Comput Vis, 2015, 39 pages.
Fang et al, "Weakly and semi supervised human body part parsing via pose-guided knowledge transfer" arXiv, May 2018, 9 pages.
Farabet et al, "Learning hierarchical features for scene labeling" PAMI, 2013, 15 pages.
Fourure et al, "Residual conv-deconv grid network for semantic segmentation" BMVC, Jul. 2017, 14 pages.
Fu et al, "Stacked deconvolutional network for semantic segmentation" arXiv, Aug. 2017, 12 pages.
Giusti et al, "Fast image scanning with deep max-pooling convolutional neural networks" arXiv, Feb. 2013, 11 pages.
Golovin et al, "Google Vizier: A Service for Black-Box Optimization," Google, 2017, 10 pages.
Gould et al, "Decomposing a scene into geometric and semantically consistent regions" ICCV, 2009, 8 pages.
Hariharan et al, "Semantic contours from inverse detectors" ICCV, 2011, 8 pages.
He et al, "Multiscale conditional random fields for image labeling" CVPR, 2004, 8 pages.
He et al., "Deep residual learning for image recognition" arXiv, Dec. 2015, 12 pages.
Hinton et al, "Deep neural networks for acoustic modeling in speech recognition: The shared views of four research groups" IEEE Signal Processing Magazine, Nov. 2012, 16 pages.
Holschneider et al, "A real-time algorithm for signal analysis with the help of the wavelet transform" Wavelets: Time-Frequency Methods and Phase Space, pp. 289-297, 1989, 14 pages.
Howard et al, "Mobilenets: Efficient convolutional neural networks for mobile vision applications" arXiv, Apr. 2017, 9 pages.
Huang et al, "Densely connected convolutional networks" arXiv, Jan. 2018, 9 pages.
Ioffe et al, "Batch normalization: accelerating deep network training by reducing internal covariate shift" arXiv, Mar. 2015, 11 pages.
Kohli et al, "Robust higher order potentials for enforcing label consistency" Int J. Comput. Vis., 2009, 23 pages.
Krähenbühl et al, "Efficient inference in fully connected crfs with gaussian edge potentials" arXiv, Oct. 2012, 9 pages.
Krizhevsky et al, "Imagenet classification with deep convolutional neural networks" NIPS, 2012, 9 pages.
Krizhevsky et al, "Learning multiple layers of features from tiny images" Technical Report, Apr. 2009, 60 pages.
Ladicky et al, "Associative hierarchical crfs for object class image segmentation" ICCV, 2009, 8 pages.
LeCun et al, "Backpropagation applied to handwritten zip code recognition" Neural Computation, 1989, 11 pages.
Liang et al, "Interpretable structure-evolving lstm" CVPR, 2017, 10 pages.
Lin et al, "Efficient piecewise training of deep structured models for semantic segmentation" arXiv, Jun. 2016, 10 pages.
Lin et al, "Microsoft coco: Common objects in context" arXiv, Feb. 2015, 15 pages.
Lin et al, "Multi-scale context intertwining for semantic segmentation" ECCV, 2018, 17 pages.
Lin et al, "Refinenet: Multi-path refinement networks with identity mappings for high-resolution semantic segmentation" arXiv, Nov. 2016, 11 pages.
Liu et al, "Darts: Differentiable architecture search" arXiv, Apr. 2019, 13 pages.
Liu et al, "Parsenet: Looking wider to see better" arXiv, Nov. 2015, 11 pages.
Liu et al, "Semantic image segmentation via deep parsing network" arXiv, Sep. 2015, 11 pages.
Liu et al, "SSD: Single shot multibox detector" arXiv, Dec. 2016, 17 pages.
Liu et al., "Progressive neural architecture search" arXiv, Jul. 2018, 20 pages.
Long et al, "Fully convolutional networks for semantic segmentation" CVPR, 2015, 10 pages.
Miikkulainen et al, "Evolving deep neural networks" arXiv, Mar. 2017, 8 pages.
Mostajabi et al, "Feedforward semantic segmentation with zoom-out features" CVPR, 2015, 10 pages.
Negrinho et al, "Deeparchitect: Automatically designing and training deep architectures" arXiv, Apr. 2017, 12 pages.
Papandreous et al, "Modeling local and global deformations in deep learning" Epitomic convolution, multiple instance learning, and sliding window detection CVPR, 2015, 10 pages.
Papandreous et al, "Personlab: Person pose estimation and instance segmentation with a bottom-up, part-based, geometric embedding model" arXiv, Mar. 2018, 21 pages.
Peng et al, "Large kernel matters—improve semantic segmentation by global convolutional network" IEEE Conference on Computer Vision and Pattern Recognition, 2017, 9 pages.
Pham et al, "Efficient neural architecture search via parameter sharing" arXiv, Feb. 2018, 11 pages.
Pinheiro et al, "Recurrent convolutional neural networks for scene labeling" ICML, 2014, 9 pages.
Qi et al, "Deformable convolutional networks—coco detection and segmentation challenge" ICCV COCO Challenge Workshop, 2017, 10 pages.
Real et al, "Large-scale evolution of image classifiers" arXiv, Jun. 2017, 18 pages.
Real et al, "Regularized evolution for image classifier architecture search" arXiv, Feb. 2019, 16 pages.
Redmon et al, "You only look once: Unified, real-time object detection" arXiv, May 2016, 10 pages.
Ren et al, "Faster r-cnn: Towards real-time object detection with region proposal networks" arXiv, Jan. 2016, 14 pages.
Ronneberger et al, "U-net: Convolutional networks for biomedical image segmentation" arXiv, May 2015, 8 pages.
Russakovsky et al, "ImageNet Large Scale Visual Recognition Challenge" arXiv, Jan. 2015, 43 pages.
Sandler et al, "Mobilenetv2: Inverted residuals and linear bottlenecks" arXiv, Mar. 2019, 14 pages.
Sandler_MobileNetV2: Inverted Risiduals and Linear Bottlenecks, arXiv, Mar. 21, 2019, 14 pages.
Saxena et al, "Convolutional neural fabrics" NIPS, 2016, 9 pages.
Schwing et al, "Fully connected deep structured network" arXiv, Mar. 2015, 10 pages.
Sermanet et al, "Overfeat: Integrated recognition, localization and detection using convolutional networks" arXiv, Feb. 2014, 16 pages.
Shotton et al, "Textonboost for image understanding. Multi-class object recognition and segmentation by jointly modeling texture, layout, and context" IJCV, Jul. 2007, 30 pages.
Sifre, "Rigid-motion scattering for image classification" Thesis for the degree of Doctor of Philisophy, Ecole Polytechnique, CMAP, Oct. 2014, 128.
Silberman et al, "Indoor segmentation and support inference from rgbd images" ECCV, 2012, 14 pages.

(56) References Cited

OTHER PUBLICATIONS

Stanley et al, "Evolving neural networks through augmenting topologies" Evolutionary Computation, 2002, 29 pages.
Sutskever et al, "Sequence to sequence learning with neural networks" NIPS, 2014, 9 pages.
Szegedy et al, "Going deeper with convolutions" arXiv, Sep. 2014, 12 pages.
Szegedy et al, "Rethinking the inception architecture for computer vision" arXiv, Dec. 2015, 10 pages.
Vanhoucke [online], "Learning visual representations at scale" Presented at ICLR 2014 Invited Talk, Apr. 2014, retrieved on Aug. 23, 2019, URL <https://www.youtube.com/watch?v=VhLe-u0M1a8>, 1 page.
Wang et al, "Design of Efficient Convolutional Layers using Single Intra-channel Convolution, Topological Subdivisioning and Spatial "Bottleneck" Structure" arXiv, Jan. 2017, 9 pages.
Wang et al, "Understanding convolution for semantic segmentation" arXiv, Jun. 2018, 10 pages.
Wu et al, "Google's neural machine translation system: Bridging the gap between human and machine translation" arXiv, Oct. 2016, 23 pages.
Xia et al, "Joint multi-person pose estimation and semantic part segmentation" arXiv, Aug. 2017, 10 pages.
Xie et al, "Genetic cnn" ICCV, 2017, 10 pages.
Yang et al, "Denseaspp for semantic segmentation in street scenes" CVPR, 2018, 9 pages.
Yao et al, "Describing the scene as a whole: Joint object detection, scene classification and semantic segmentation" CVPR, 2012, 8 pages.
Yu et al, "Learning a discriminative feature network for semantic segmentation" arXiv, Apr. 2018, 10 pages.
Yu et al, "Multi-scale context aggregation by dilated convolutions" arXiv, Apr. 2016, 13 pages.
Zhang et al, "Context encoding for semantic segmentation" arXiv, Mar. 2018, 11 pages.
Zhang et al, "Exfuse: Enhancing feature fusion for semantic segmentation" ECCV, 2018, 16 pages.
Zhao et al, "Pyramid scene parsing network" arXiv, Apr. 2017, 11 pages.
Zheng et al "Conditional random fields as recurrent neural networks" ICCV, 2015, 17 pages.
Zoph et al, "Learning Transferable Architectures for Scalable Image Recognition," arXiv, Apr. 11, 2018, 14 pages.
Zhong et al, "Practial Block-wise Neural Network Architecture Generation" arXiv, May 2018, 11 pages.
Liang-Chieh Chen et al. "DeepLab: Semantic Image Segmentation with Deep Convolutional Netws, Atrous Convolution and Fully Connected CRFs," arXiv 1606.00915v1, Jun. 2, 2016, 14 pages.
Liang-Chieh Chen et al. "Searching for Efficient Multi-Scale Architectures for Dense Image Prediction," arXiv 1809.04184v1, Sep. 11, 2018, 14 pages.
PCT International Search Report and Written Opinion issued in the International Application No. PCT/US2019/034467, dated Sep. 16, 2019, 18 pages.
Yosinski et al. "How transferable are features in deep neural networks," NIPS Dec. 2014, 9 pages.

\* cited by examiner

NEURAL ARCHITECTURE SEARCH FOR DENSE IMAGE PREDICTION TASKS

CROSS-REFERENCE TO RELATED APPLICATION

This application is based upon and claims benefit of priority of the prior Greek Patent Application No. 20180100232, filed on May 29, 2018. The disclosure of the foregoing application is hereby incorporated by reference in its entirety.

BACKGROUND

This specification relates to determining architectures for neural networks that perform image processing tasks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that determines an architecture for a neural network that is configured to perform a dense image prediction task.

Generally, a dense image prediction task is a task that requires making a respective prediction for each of a large number of pixels in an input image. Many dense image prediction task require assigning a label or otherwise making a prediction for each pixel of the image. Thus, dense image prediction tasks generally require the neural network to operate on high-resolution images and to maintain the resolution of the images throughout the processing pipeline.

To determine the architecture, the system obtains training data for the dense image prediction task. The system then determines an architecture for a neural network that is configured to perform the dense image prediction task, i.e., to receive inputs and generate outputs that conform to the requirements of the dense prediction task, using the training data.

In particular, the system searches a space of candidate architectures to identify one or more best performing architectures using the training data. Each candidate architecture in the space of candidate architectures includes (i) the same first neural network backbone that is configured to receive an input image and to process the input image to generate a plurality of feature maps and (ii) a different dense prediction cell configured to process the plurality of feature maps and to generate an output for the dense image prediction task. Thus, each candidate architecture includes the same neural network backbone as each other candidate architecture but has a different dense prediction cell from each other candidate architecture.

The system then determines the architecture for the neural network based on the best performing candidate architectures.

Particular embodiments of the subject matter described in this specification can be implemented so as to realize one or more of the following advantages.

The architecture search techniques described in this specification can determine a high-performing architecture for a dense prediction task in a computationally efficient manner. In particular, because dense prediction tasks require generating predictions for a large number of the pixels in the input image, such tasks require the network to operate on high resolution imagery. This makes existing architecture search techniques, e.g., techniques geared for image classification or other, non-dense image processing tasks, ill-suited for use for these tasks. This is because many of these tasks rely on low-resolution proxy tasks that would not be representative of the final dense image prediction task or require a search space to be searched that is so large as to make such searching computationally infeasible when operating on high-resolution images.

The described techniques, on the other hand, effectively limit the search space to identifying the best architecture for a dense prediction cell, resulting in architectures that have performance that exceeds the previous state-of-the-art in multiple dense image prediction tasks.

Moreover, by making use of the described techniques, the resulting architecture can be more computationally efficient than the previously state-of-the-art models while exceeding their performance. As examples of the kinds of results that the described techniques can achieve, the resulting architectures can achieve state-of-the-art performance on several dense prediction tasks, including achieving 82.7% mIOU accuracy on the Cityscapes data set (street scene parsing), 71.3% mIOU accuracy on the PASCAL-Person-Part data set (person-part segmentation), and 87.9% mIOU accuracy on the PASCAL VOC 2012 data set (semantic image segmentation). At the same time, the resulting architectures are more computationally efficient, requiring approximately half the parameters and half the computational cost as previous state of the art systems to achieve these levels of performance on these data sets.

Additionally, by making use of a smaller backbone during the search than will be included in the final architecture, the amount of resources consumed by the search process is reduced. Additionally, by pre-training the backbone, e.g., on an object segmentation task, and then holding the backbone fixed during the search, the amount of resources consumed by the search process is reduced. Additionally, by pre-computing and then caching the feature maps generated by the pre-trained backbone, the amount of resources consumed by the search is reduced. As a particular example, when the backbone is smaller and the feature maps generated by the pre-trained backbone are pre-computed and cached, the system can perform the search with much less latency and much greater data efficiency (i.e., using much less memory), than techniques that rely on training candidate neural networks without pre-caching inputs and without decreasing the size of the The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that determines an architecture for a neural network that is configured to perform a dense image prediction task.

Generally, a dense image prediction task is a task that requires making a respective prediction for each of a large number of pixels in an input image. Many dense image prediction tasks require assigning a label or otherwise making a prediction for each pixel of the image. Thus, dense image prediction tasks generally require the neural network to operate on high-resolution images.

One example of a dense image prediction task is an image segmentation task. In an segmentation task, the input is an image and the output is a respective label for every pixel in the image that classifies the content depicted at that pixel in the image.

One example of an image segmentation task is a person-part segmentation task, where the inputs are images of one or more people and the output is a respective label for every pixel in the image such that the labels classify which pixels correspond to which person parts (e.g., head, torso, legs, and so on) and which correspond to the background (i.e., do not depict any people).

Another example of an image segmentation task is a semantic image segmentation task. In a semantic image segmentation task, the input is an image and the output is a respective label for every pixel in the image that identifies which object class the pixel belongs to, e.g., from a set of multiple foreground object classes and one or more background object classes.

Another example of an image segmentation task is a scene parsing task. In a scene parsing task, the input is an image and the output is a respective label for every pixel in the image that identifies which portion of a scene depicted in the image the pixel belongs to.

Another example of a dense image prediction task is an object detection task. In an object detection task, the input is an image and the output is data that specifies which pixels of the image are parts of an image of an object. For example, the output may be a label for each pixel in the image that identifies whether the pixel is part of an image of an object. As another example, the output may be a score for each of a large number of bounding boxes in the image that indicates whether the bounding box is part of an image of an object.

Figure 1:
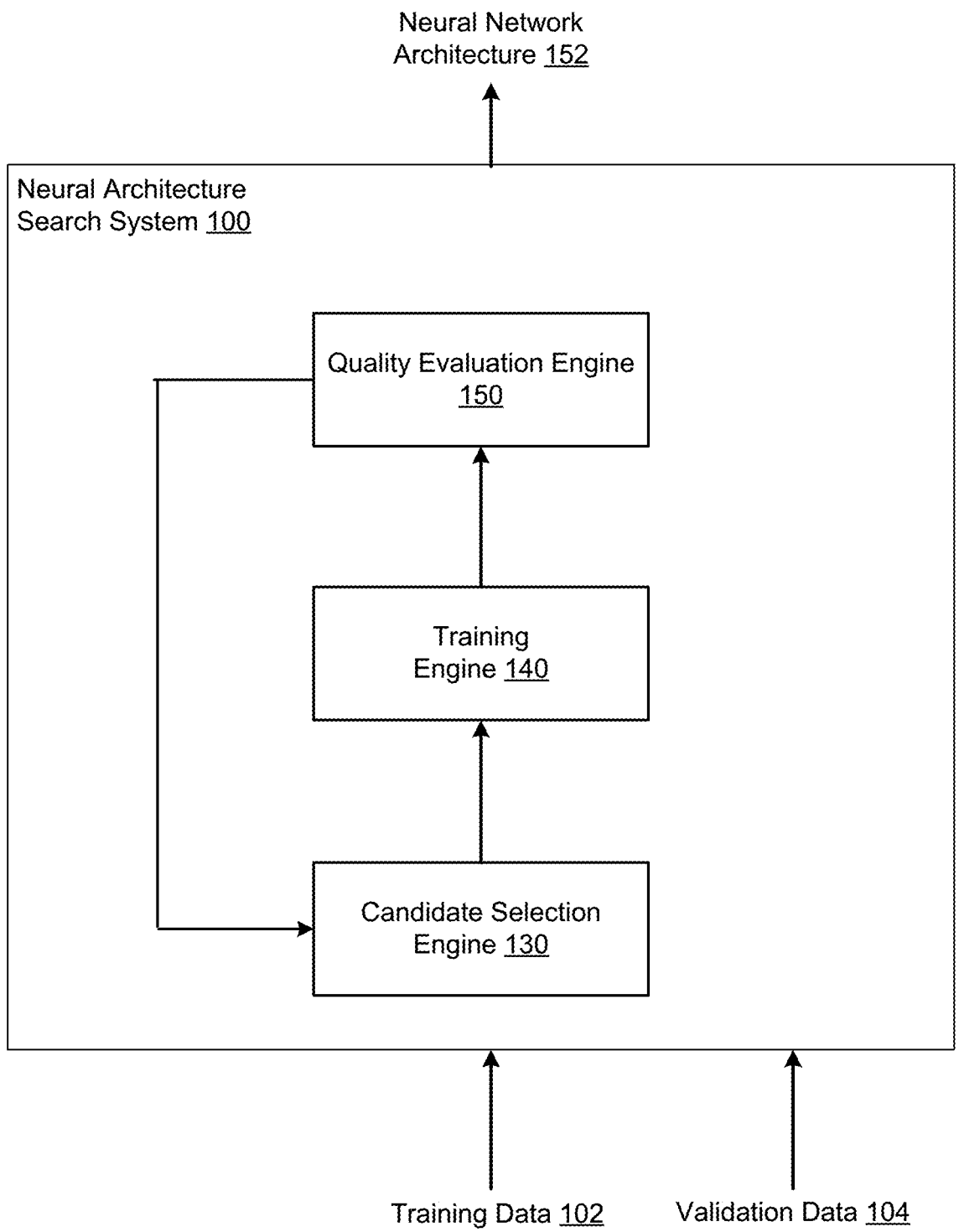
FIG. 1 shows an example neural architecture search system.

FIG. 1 shows an example neural architecture search system 100. The neural architecture search system 100 is an example of a system implemented as computer programs on one or more computers in one or more locations, in which the systems, components, and techniques described below can be implemented.

The neural architecture search system 100 is a system that obtains training data 102 for training a neural network to perform a dense image prediction task and a validation set 104 for evaluating the performance of the neural network on the dense image prediction task. The system then uses the training data 102 and the validation set 104 to determine an architecture for a neural network that is configured to perform the dense image prediction task i.e., to receive inputs and generate outputs that conform to the requirements of the dense prediction task. The architecture defines the number of layers in the neural network, the operations performed by each of the layers, and the connectivity between the layers in the neural network, i.e., which layers receive inputs from which other layers in the neural network.

Generally, the training data 102 and the validation set 104 both include a set of training inputs and, for each training input, a respective target output that should be generated by the neural network to perform the dense image prediction task. For example, a larger set of training data may have been randomly partitioned to generate the training data 102 and the validation set 104. In the dense image prediction task setting, each training input is an image and the neural network output for the training input identifies the labels that should be assigned to some or all of the pixels in the training input.

The system 100 can receive the training data 102 and the validation set 104 in any of a variety of ways. For example, the system 100 can receive training data as an upload from a remote user of the system over a data communication network, e.g., using an application programming interface (API) made available by the system 100, and randomly divide the uploaded data into the training data 102 and the validation set 104. As another example, the system 100 can receive an input from a user specifying which data that is already maintained by the system 100 should be used for training the neural network, and then divide the specified data into the training data 102 and the validation set 104.

Generally, the system 100 determines the architecture for the neural network by searching a space of candidate architectures to identify one or more best performing architectures.

Each candidate architecture in the space of candidate architectures includes (i) the same first neural network backbone that is configured to receive an input image and to process the input image to generate a plurality of feature maps and (ii) a different dense prediction cell configured to process the plurality of feature maps and to generate an output for the dense image prediction task.

Thus, each candidate architecture includes the same neural network backbone as each other candidate architecture but has a different dense prediction cell from each other candidate architecture.

Figure 2:
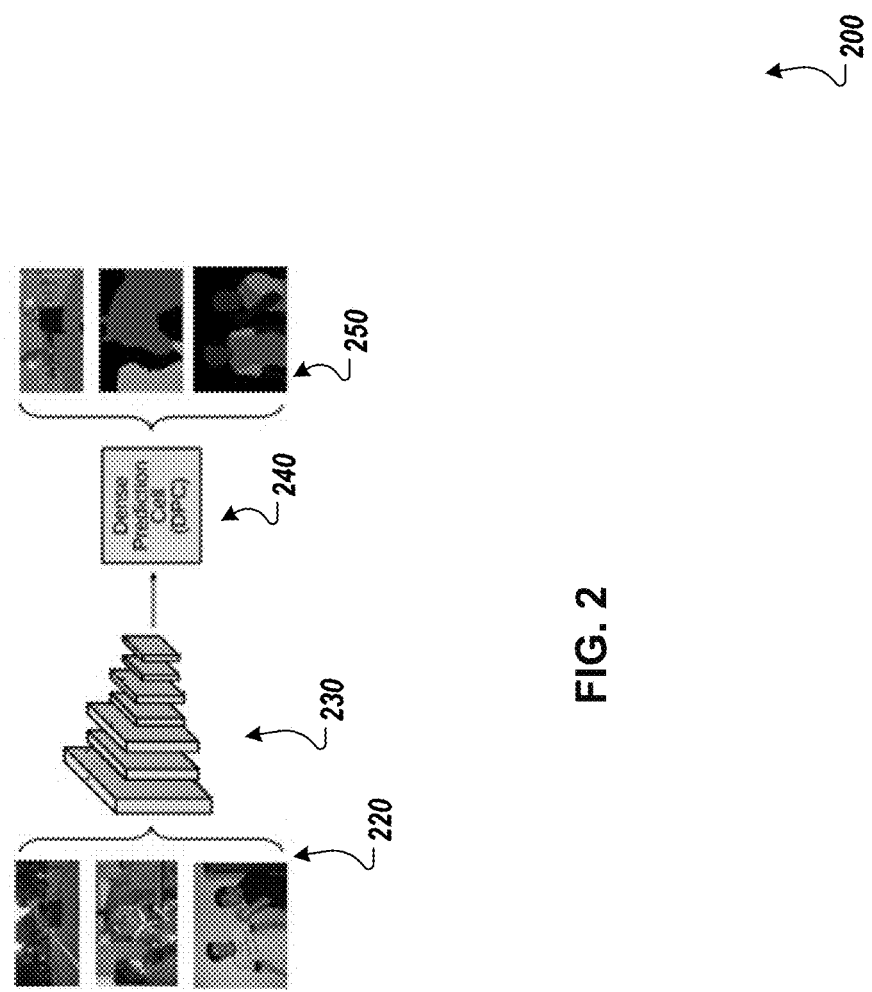
FIG. 2 shows an example candidate architecture.

FIG. 2 shows a candidate neural network architecture 200. As described above, the architecture 200 receives a training input 220, i.e., one of the three images shown in FIG. 2, and generates a neural network output 250 that assigns labels to the training input. As shown in FIG. 2, the neural network output 250 is represented as an overlay over the corresponding input image, with pixels assigned the same label being in the same shade in the overlay.

The candidate neural network architecture includes a backbone 230 that is made up of multiple neural networks layers, e.g., convolutional layers optionally combined with other types of layers (batch normalization, pooling, and so on) and receives the training input 220 and generates feature maps that are provided as input to a dense prediction cell (DPC) 240. The dense prediction cell 240 processes the feature maps to generate the neural network output 250.

As indicated above, each candidate neural network in the search space has the same backbone 230 but all of the candidate neural networks have different DPCs 240. Thus, the search space for the architecture search is the space of possible architectures for the DPC 240.

An example of a space of possible architectures for the DPC 240 that can be searched by the system 100 follows.

For example, the DPC can have B branches, where B is a fixed integer greater than one. Each of the B branches of the DPC maps an input tensor to the branch to an output tensor by applying an operation to the input tensor. The DPC can then combine, e.g., concatenate, the output tensors generated by all of the B branches to generate a combined tensor output or use the output tensor generated by a designated one of the B branches, e.g., the last of the B branches in a processing order, as the combined tensor output. B can be, e.g., an integer in the range of 3 to 10, inclusive, with larger values of B allowing more flexibility and a larger search space but increasing the computational cost of the search process.

In some cases, the combined tensor output can be used as the output of the DPC 240 for the dense prediction task. In other cases, the DPC processes the combined tensor output through one or more output layers, e.g., a sigmoid output layer, to generate a final output.

Thus, the different architectures in the search space each specify (i) an input tensor from a set of input tensors to be provided as input to each of the B branches, and (ii) an operation from a set of operations to be performed by each of the B branches to generate the output tensor from the input tensor.

The input tensor for a given branch can be selected from a set that includes (i) the feature maps generated by the backbone and (ii) output tensors generated by any branches before the given branch in the processing order of the B branches. Thus, for the first branch in the processing order, the set includes only the feature maps generated by the backbone while for the last of the B branches in the processing order, the set includes (i) the feature maps generated by the backbone and (ii) output tensors generated by any of the B−1 other branches.

The operator space, i.e., the space of possible operations from which the operation performed by each of the B blocks is selected, can include one or more of the following: (1) a convolution with a 1×1 kernel, (2) one or more atrous separable convolutions, each having a different sampling rate, and (3) one or more spatial pyramid pooling operations, each having a respective grid size.

When the operator space includes multiple atrous separable convolutions, each of the atrous separable convolutions will have a different sampling rate. For example, the sampling rate can be defined as $r\_h \times r\_w$, where each of $r\_h$ and $r\_w$ is selected from the set of $\{1, 2, 6, 9, \ldots, 21\}$.

When the operator space includes multiple spatial pyramid pooling operations, each of the spatial pyramid pooling operations will have a different grid size. For example, the grid size can be defined as $g\_h \times g\_w$, where each of $g\_h$ and $g\_w$ is selected from the set of $\{1, 2, 4, 8\}$.

Other examples of search spaces can include different operator spaces and different possible values for the sampling rates and grid sizes of the operators in the space.

Returning to the description of FIG. 1, the system 100 includes a candidate selection engine 130, a training engine 140, and a quality evaluation engine 150.

To search the space of candidate architectures, the system repeatedly performs a set of architecture search operations.

At each iteration of the operations, the candidate selection engine 130 selects one or more candidate architectures from the space of possible candidate architectures using quality measures for candidate architectures that have already been evaluated.

The training engine 140 then trains the selected candidate architectures on at least some of the training data 102 and the quality evaluation engine 150 evaluates the trained candidate architectures using the validation set 104.

Selecting candidate architectures, training the candidate architectures, and evaluating the quality of the architectures is described in more detail below with reference to FIGS. 3 and 4.

After the architecture search operations have been repeatedly performed, the system 100 can identify as the best performing candidate architectures a threshold, fixed number of candidate architectures evaluated during the search that had the best quality measures.

Once the system 100 has identified the best performing candidate architectures, the system 100 determines the final architecture for the neural network based on the best performing candidate architectures.

For example, the system 100 can generate, from each of the identified best performing candidates, a final architecture, and then train the final architectures to convergence on the dense prediction task. The system can then select the best performing, e.g., as determined based on a quality measure on the validation set 104, trained architecture as the architecture of the neural network.

In some implementations, the candidate architecture and the corresponding final architecture are the same.

In other implementations, however, the system 100 replaces the neural network backbone with a different, larger neural network backbone that has more parameters and that allows the final neural network to perform better on the dense prediction task.

In other words, in some cases, the system uses a smaller backbone for the architecture search than is employed by the final architecture.

For example, the system can employ an Xception architecture for the backbone in the final architecture while employing the MobileNet-v2 architecture for the candidate architectures, i.e., during the search. The MobileNet-v2 architecture requires roughly one twentieth the computational cost of the Xception architecture and cuts down the number of channels in the backbone feature maps from 2048 to 320 dimensions. The Xception architecture is described in more detail in F. Chollet. Xception: Deep learning with depthwise separable convolutions. In CVPR, 2017 while the MobileNet-v2 architecture is described in more detail in M. Sandler, A. Howard, M. Zhu, A. Zhmoginov, and L.-C. Chen. Mobilenetv2: Inverted residuals and linear bottlenecks. In CVPR, 2018.

Using the smaller backbone can allow the system to make architecture search more computationally efficient while still providing a quality signal for how well the final architecture having the larger backbone will perform on the dense image prediction task.

Additional techniques that can be employed by the system to improve the computational efficiency of the search are described below with reference to FIG. 4.

The neural network search system 100 can then output architecture data 152 that specifies the final architecture of the neural network, i.e., data specifying the layers that are part of the neural network, the connectivity between the layers, and the operations performed by the layers. For example, the neural network search system 100 can output the architecture data 152 to the user that submitted the training data.

In some implementations, instead of or in addition to outputting the architecture data 152, the system 100 uses the trained neural network having the final architecture to process requests received by users, e.g., through the API provided by the system. That is, the system 100 can receive inputs to be processed, use the trained neural network to process the inputs, and provide the outputs generated by the trained neural network or data derived from the generated outputs in response to the received inputs.

Figure 3:
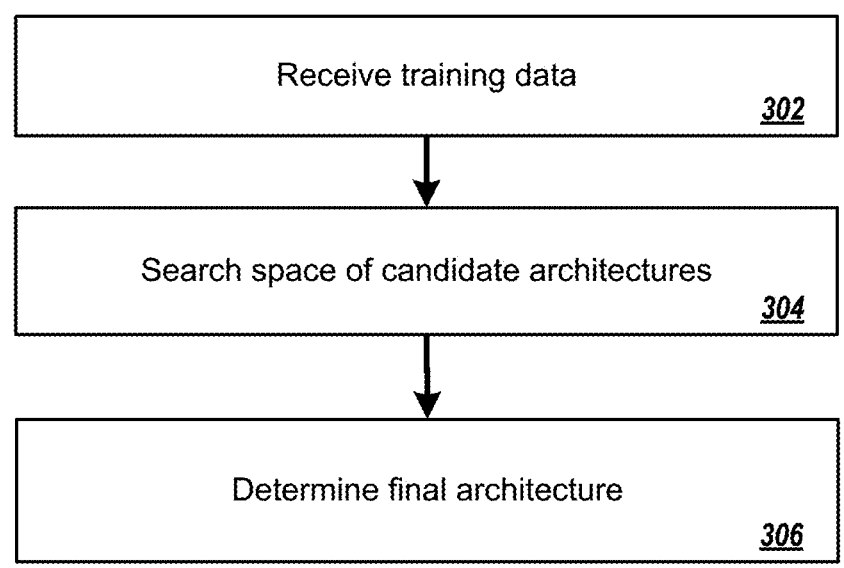
FIG. 3 is a flow diagram of an example process for determining a final architecture.

FIG. 3 is a flow diagram of an example process 300 for determining a final architecture for a dense image prediction task. For convenience, the process 300 will be described as being performed by a system of one or more computers located in one or more locations. For example, a neural architecture search system, e.g., the neural architecture search system 100 of FIG. 1, appropriately programmed, can perform the process 300.

The system receives training data for the dense image prediction task (step 302).

The system searches a space of candidate architectures to identify one or more best performing architectures using the training data (step 304). Searching the space of candidate architectures is described in more detail below with reference to FIG. 4. Once the search has completed, the system can select, as the best performing architectures, a threshold number of candidate architectures that had the best quality evaluation during the search.

The system determines the architecture for the neural network based on the one or more best performing candidate architectures (step 306). For example, the system can generate, from each of the identified best performing candidates, a final architecture, and then train the final architectures to convergence on the dense prediction task. The system can then select the best performing trained architecture, e.g., as determined based on a quality measure on the validation set, as the architecture of the neural network. The quality measure that is used can be the same as the one described below with reference to step 410.

In some implementations, the candidate architecture and the corresponding final architecture are the same.

In other implementations, however, the system replaces the neural network backbone with a different, larger neural network backbone that has more parameters and that allows the final neural network to perform better on the dense prediction task.

In other words, in some cases, the system uses a smaller backbone for the architecture search than is employed by the final architecture.

Figure 4:
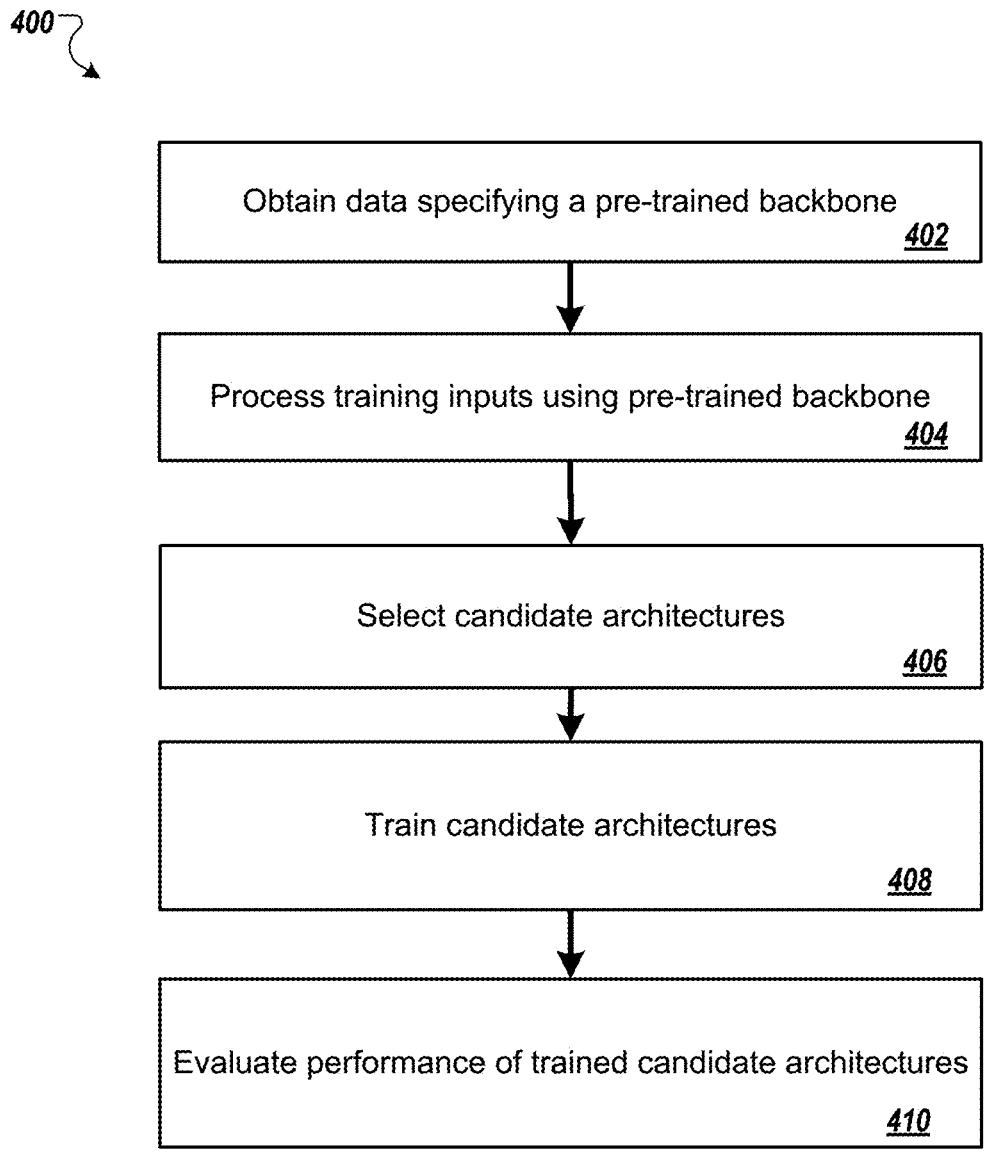
FIG. 4 is a flow diagram of an example process for searching the space of candidate architectures.

FIG. 4 is a flow diagram of an example process 400 for searching the space of candidate architectures. For convenience, the process 400 will be described as being performed by a system of one or more computers located in one or more locations. For example, a neural architecture search system, e.g., the neural architecture search system 100 of FIG. 1, appropriately programmed, can perform the process 400.

The system obtains data specifying a pre-trained backbone for use in searching the space of candidate architectures (step 402). In some cases, the system pre-trains the backbone along with a placeholder DPC on a placeholder dense image prediction task to determine trained values of the parameters of the backbone, i.e., so that the system only needs train the backbone once for the entire search process. In some other cases, the system obtains data specifying the trained values of the backbone parameters from another system that has already pre-trained the backbone.

Optionally, the system processes at least some of the training inputs in the training data using the pre-trained backbone to generate feature maps for the training inputs (step 404). In other words, the system processes each of the training inputs using the pre-trained backbone, i.e., in accordance with the trained values of the parameters of the backbone, to generate feature maps and then stores the generated feature maps for use during the search process. When the system is using the smaller backbone for the search, because the feature maps generated by the smaller backbone have many fewer channels than the feature maps generated by the larger backbone (that will be used in the final architecture), storing the feature maps requires much less storage space than would be required to store feature maps generated by the larger backbone.

The system then repeatedly performs steps 406-410 until termination criteria for the search are satisfied, e.g., until a threshold number of candidate architectures have been evaluated, until the highest performing candidate architecture reaches a threshold accuracy, or until a threshold amount of time has elapsed.

The system selects one or more candidate architectures from the space of candidate architectures (step 406). The system can use any of a variety of techniques for searching the space to select the candidate architectures.

For example, the system can use a random search strategy. In a random search strategy, at each iteration of the process 400, the system selects one or more architectures from the space of candidate architectures uniformly at random while also selecting one or more architectures that are close to, i.e., are similar to, the currently best observed architectures, i.e., the architectures already evaluated as part of the search that have been found to perform best on the dense prediction task. Random search strategies that can be employed by the system are described in more detail in D. Golovin, B. Solnik, S. Moitra, G. Kochanski, J. Karro, and D. Sculley. *Google vizier: A service for black-box optimization*. In SIGKDD, 2017 and in B. Zoph, V. Vasudevan, J. Shlens, and Q. V. Le. *Learning transferable architectures for scalable image recognition*. In CVPR, 2018.

As another example, the system can use a reinforcement learning guided search strategy to select the candidate actions. In particular, at each iteration of the process 400, the system can select architectures that are output by a recurrent neural network that is being trained through reinforcement learning to output candidate architectures that perform well on the task. Examples of reinforcement learning guided search strategies that can be employed by the system are described in more detail in B. Zoph and Q. V. Le. *Neural architecture search with reinforcement learning*. In ICLR, 2017.

The system trains the selected one or more candidate architectures on at least a portion of the training data (step 408). That is, for each selected candidate, the system trains a neural network having the architecture until criteria for stopping the training are satisfied. During the training, the system holds the trained values of the backbone parameters fixed while updating the values of the parameters of the DPC in the neural network.

In particular, in implementations where step 404 was performed to pre-process the training data using the pre-trained backbone, the system does not process the training inputs using the backbone during step 408 and instead accesses the pre-generated feature maps from memory and provides the pre-generated feature maps as input to the DPC. This greatly decreases the processing power and time consumed by the training, since training inputs do not need to be processed through backbone to generate the feature maps before the feature maps can processed by the DPC.

The system can perform this training using an early stopping criterion, i.e., can train each candidate for a fixed number of iterations instead of to convergence.

The system evaluates the performance of each of the trained candidate architectures (step 410). The system uses an evaluation metric that measures the performance of the trained neural network having the candidate architecture on the validation set to evaluate the performance.

Any evaluation metric that is appropriate for dense prediction tasks can be used. For example, the system can use the pixel-wise mean intersection-over-union (mIOU) of the trained neural network over the validation data set as the evaluation metric. As another example, the system can use the mean pixel accuracy over the validation data set of the trained neural network as the evaluation metric.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:

obtaining training data for a dense image prediction task, wherein the dense image prediction task is a task that requires processing an image to generate an output that includes a respective prediction for each of a plurality of pixels in the image, and wherein the training data comprises a plurality of training inputs; and determining an architecture for a neural network configured to perform the dense image prediction task, comprising:

searching a space of candidate architectures to identify one or more best performing architectures using the training data, wherein the candidate architectures in the space of candidate architectures all have (i) a same first neural network backbone that is configured to receive an input image and to process the input image to generate a plurality of feature maps and (ii) a respective dense prediction cell configured to process the plurality of feature maps and to generate an output for the dense image prediction task, wherein each candidate architecture in the space has a different respective dense prediction cell from each other candidate architecture in the space, wherein the searching comprises:

obtaining data specifying a pre-trained first neural network backbone, the data specifying the pre-trained first neural network backbone comprising trained values of the parameters of the first neural network backbone;

processing each of the plurality of training inputs using the pre-trained first neural network backbone and in accordance with the trained values of the parameters of the first neural network backbone to generate a respective plurality of feature maps for each of the plurality of training inputs;

storing the respective plurality of feature maps for each of the plurality of training inputs in one or more memories; and repeatedly performing the following operations:

selecting one or more candidate architectures from the space of candidate architectures, each selected candidate architecture having the same first neural network backbone and a respective dense prediction cell;

training each of the selected one or more candidate architectures on at least a portion of the training data to update parameters of the respective dense prediction cell in the candidate architecture while holding the trained values of the parameters of the first neural network backbone fixed, the training comprising, for each training input in the portion of the training data:

accessing the respective plurality of feature maps generated for the training input by the pre-trained dense prediction cell from the one or more memories; and providing the plurality of feature maps that were accessed from memory as input to the respective dense prediction cell instead of processing the training input using the first neural network backbone;

for each of the trained candidate architectures, evaluating the performance of the trained candidate architecture on the dense image prediction task; and determining the architecture for the neural network based on the best performing candidate architectures.

2. The method of claim 1, wherein training each of the selected one or more candidate architectures comprises training each selected candidate architecture for a fixed number of iterations instead of to convergence.

3. The method of claim 1, further comprising:
pre-training the first neural network backbone to determine the trained values of the parameters of the first neural network backbone.

4. The method of claim 1, wherein selecting one or more candidate architectures comprises:
selecting the one or more candidate architectures using a random search strategy.

5. The method of claim 1, wherein determining the architecture for the neural network based on the best performing candidate architectures comprises:
for each of the one or more best performing candidate architectures, generating a final architecture and further training the final architecture to convergence on the dense prediction task using the training data; and
selecting the best performing final architecture as the architecture for the neural network.

6. The method of claim 5, wherein generating the final architecture comprises replacing the first neural network backbone with a larger neural network backbone having more parameters.

7. The method of claim 1, wherein each respective dense prediction cell includes B branches, wherein B is a fixed integer greater than one, and wherein each of the B branches maps an input tensor to an output tensor by applying an operation to the input tensor.

8. The method of claim 7, wherein the dense prediction cell combines the output tensors generated by the B branches to generate a combined output tensor.

9. The method of claim 8, wherein the dense prediction cell concatenates the output tensors.

10. The method of claim 8, wherein the dense prediction cell processes the combined output tensor through one or more output layers to generate the output for the dense prediction task.

11. The method of claim 7, wherein each candidate architecture specifies (i) an input tensor from a set of input tensors to be provided as input to each of the B branches in the respective dense prediction cell in the candidate architecture, and (ii) an operation from a set of operations to be performed by each of the B branches in the respective dense prediction cell in the candidate architecture.

12. The method of claim 11, wherein the set of operations includes a convolution with a 1×1 kernel.

13. The method of claim 11, wherein the set of operations includes one or more atrous separable convolution operations, each having a respective sampling rate.

14. The method of claim 11, wherein the set of operations includes one or more spatial pyramid pooling operations, each having a respective grid size.

15. The method of claim 7, wherein the B branches are ordered and wherein, for each of the B branches, the set of input tensors includes (i) the feature maps generated by the first network backbone and (ii) output tensors generated by any branches before the branch in the order of the B branches.

16. A system comprising one or more computers and one or more storage devices storing instructions that when executed by the one or more computers cause the one or more computers to perform operations comprising:

obtaining training data for a dense image prediction task, wherein the dense image prediction task is a task that requires processing an image to generate an output that includes a respective prediction for each of a plurality of pixels in the image, and wherein the training data comprises a plurality of training inputs; and determining an architecture for a neural network configured to perform the dense image prediction task, comprising:

searching a space of candidate architectures to identify one or more best performing architectures using the training data, wherein the candidate architectures in the space of candidate architectures all have (i) a same first neural network backbone that is configured to receive an input image and to process the input image to generate a plurality of feature maps and (ii) a respective dense prediction cell configured to process the plurality of feature maps and to generate an output for the dense image prediction task, wherein each candidate architecture in the space has a different respective dense prediction cell from each other candidate architecture in the space, wherein the searching comprises:

obtaining data specifying a pre-trained first neural network backbone, the data specifying the pre-trained first neural network backbone comprising trained values of the parameters of the first neural network backbone;

processing each of the plurality of training inputs using the pre-trained first neural network backbone and in accordance with the trained values of the parameters of the first neural network backbone to generate a respective plurality of feature maps for each of the plurality of training inputs;

storing the respective plurality of feature maps for each of the plurality of training inputs in one or more memories; and repeatedly performing the following operations:
selecting one or more candidate architectures from the space of candidate architectures, each selected candidate architecture having the same first neural network backbone and a respective dense prediction cell;

training each of the selected one or more candidate architectures on at least a portion of the training data to update parameters of the respective dense prediction cell in the candidate architecture while holding the trained values of the parameters of the first neural network backbone fixed, the training comprising, for each training input in the portion of the training data:
    accessing the respective plurality of feature maps generated for the training input by the pre-trained dense prediction cell from the one or more memories; and
    providing the plurality of feature maps that were accessed from memory as input to the respective dense prediction cell instead of processing the training input using the first neural network backbone;
for each of the trained candidate architectures, evaluating the performance of the trained candidate architecture on the dense image prediction task; and
determining the architecture for the neural network based on the best performing candidate architectures.

17. The system of claim 16, wherein determining the architecture for the neural network based on the best performing candidate architectures comprises:
    for each of the one or more best performing candidate architectures, generating a final architecture and further training the final architecture to convergence on the dense prediction task using the training data; and
    selecting the best performing final architecture as the architecture for the neural network.

18. The system of claim 17, wherein generating the final architecture comprises replacing the first neural network backbone with a larger neural network backbone having more parameters.

19. The system of claim 16, wherein each respective dense prediction cell includes B branches, wherein B is a fixed integer greater than one, and wherein each of the B branches maps an input tensor to an output tensor by applying an operation to the input tensor.

20. The system of claim 19, wherein the dense prediction cell combines the output tensors generated by the B branches to generate a combined output tensor.

21. One or more computer-readable storage media storing instructions that when executed by one or more computers cause the one or more computers to perform operations comprising:
    obtaining training data for a dense image prediction task, wherein the dense image prediction task is a task that requires processing an image to generate an output that includes a respective prediction for each of a plurality of pixels in the image, and wherein the training data comprises a plurality of training inputs; and
    determining an architecture for a neural network configured to perform the dense image prediction task, comprising:
        searching a space of candidate architectures to identify one or more best performing architectures using the training data, wherein the candidate architectures in the space of candidate architectures all have (i) a same first neural network backbone that is configured to receive an input image and to process the input image to generate a plurality of feature maps and (ii) a respective dense prediction cell configured to process the plurality of feature maps and to generate an output for the dense image prediction task, wherein each candidate architecture in the space has a different respective dense prediction cell from each other candidate architecture in the space, wherein the searching comprises:
    obtaining data specifying a pre-trained first neural network backbone, the data specifying the pre-trained first neural network backbone comprising trained values of the parameters of the first neural network backbone;
    processing each of the plurality of training inputs using the pre-trained first neural network backbone and in accordance with the trained values of the parameters of the first neural network backbone to generate a respective plurality of feature maps for each of the plurality of training inputs;
    storing the respective plurality of feature maps for each of the plurality of training inputs in one or more memories; and
    repeatedly performing the following operations:
        selecting one or more candidate architectures from the space of candidate architectures, each selected candidate architecture having the same first neural network backbone and a respective dense prediction cell;
        training each of the selected one or more candidate architectures on at least a portion of the training data to update parameters of the respective dense prediction cell in the candidate architecture while holding the trained values of the parameters of the first neural network backbone fixed, the training comprising, for each training input in the portion of the training data:
            accessing the respective plurality of feature maps generated for the training input by the pre-trained dense prediction cell from the one or more memories; and
            providing the plurality of feature maps that were accessed from memory as input to the respective dense prediction cell instead of processing the training input using the first neural network backbone;
    for each of the trained candidate architectures, evaluating the performance of the trained candidate architecture on the dense image prediction task; and
    determining the architecture for the neural network based on the best performing candidate architectures.

* * * * *